(12) United States Patent
Matsumaru et al.

(10) Patent No.: US 10,968,316 B2
(45) Date of Patent: Apr. 6, 2021

(54) POLYIMIDE RESIN AND POLYIMIDE FILM

(71) Applicant: MITSUBISHI GAS CHEMICAL COMPANY, INC., Tokyo (JP)

(72) Inventors: Teruhisa Matsumaru, Kanagawa (JP); Shuya Suenaga, Kanagawa (JP); Yohei Abiko, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 244 days.

(21) Appl. No.: 15/758,247

(22) PCT Filed: Sep. 16, 2016

(86) PCT No.: PCT/JP2016/077562
§ 371 (c)(1),
(2) Date: Mar. 7, 2018

(87) PCT Pub. No.: WO2017/051783
PCT Pub. Date: Mar. 30, 2017

(65) Prior Publication Data
US 2018/0244847 A1     Aug. 30, 2018

(30) Foreign Application Priority Data

Sep. 25, 2015 (JP) .............................. JP2015-188106
Sep. 25, 2015 (JP) .............................. JP2015-188109

(51) Int. Cl.
*C08G 73/14* (2006.01)
*B32B 27/28* (2006.01)
(Continued)

(52) U.S. Cl.
CPC .............. *C08G 73/16* (2013.01); *B32B 27/06* (2013.01); *B32B 27/281* (2013.01);
(Continued)

(58) Field of Classification Search
CPC ....... B32B 27/34; B32B 27/06; B32B 27/281; B32B 2250/02; B32B 2307/412;
(Continued)

(56) References Cited

U.S. PATENT DOCUMENTS 6,808,766 B1   10/2004 Miyama et al.
2014/0066571 A1   3/2014 Takasawa et al.
(Continued)

FOREIGN PATENT DOCUMENTS

CN   104704057   6/2015
CN   104837894   8/2015
(Continued)

OTHER PUBLICATIONS

International Search Report from Application No. PCT/JP2016/077562, dated Dec. 6, 2016.
(Continued)

*Primary Examiner* — John D Freeman
(74) *Attorney, Agent, or Firm* — Greenblum & Bernstein, P.L.C.

(57) ABSTRACT

Disclosed are a polyimide resin containing a structural unit represented by the following formula (1-1), and a polyimide film containing a structural unit represented by the following formula (1-2) and having a thickness of 10 to 50 μm. $R^1$ and $R^2$ in the formula (1-1) each independently represent any group of the following formulae (i) to (iv), $R^1$ and $R^2$ in the formula (1-2) each independently represent a group of the following formula (i) or formula (ii), and in these formulae, * bonds to the carbon with * in the formula (1-1) and the formula (1-2) and  bonds to the carbon with  in the formula (1-1) and the formula (1-2). A polyimide resin capable of forming a polyimide film excellent in transparency and having a low coefficient of linear thermal expansion, and a polyimide film having a lower coefficient of linear thermal expansion are provided.

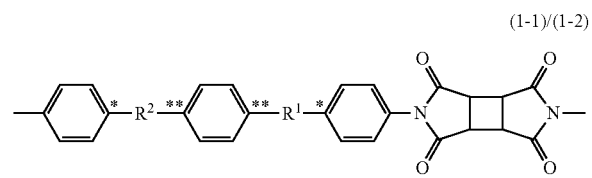

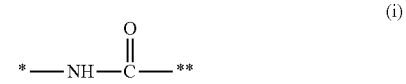

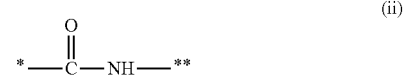

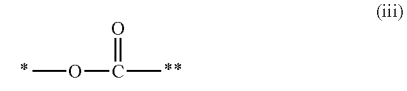

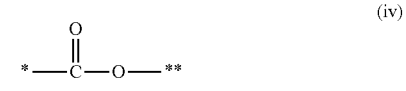

11 Claims, No Drawings

(51) Int. Cl.
*C08G 73/16* (2006.01)
*C08G 73/10* (2006.01)
*B32B 27/06* (2006.01)

(52) U.S. Cl.
CPC ......... *C08G 73/1042* (2013.01); *C08G 73/14* (2013.01); *B32B 2250/02* (2013.01); *B32B 2307/412* (2013.01); *B32B 2379/08* (2013.01); *B32B 2457/14* (2013.01); *B32B 2457/20* (2013.01); *B32B 2551/00* (2013.01)

(58) Field of Classification Search
CPC ............ B32B 2379/08; B32B 2457/14; B32B 2457/20; B32B 2551/00; C08G 73/1042; C08G 73/14; C08G 73/16; C08G 73/1078; C08G 73/1039; C08J 5/18
See application file for complete search history.

(56) References Cited

U.S. PATENT DOCUMENTS

| | | | |
|---|---|---|---|
| 2015/0011726 A1* | 1/2015 | Hasegawa | C08G 73/14 528/322 |
| 2015/0225523 A1 | 8/2015 | Suenga et al. | |
| 2015/0307662 A1 | 10/2015 | Oka et al. | |

FOREIGN PATENT DOCUMENTS

| | | |
|---|---|---|
| CN | 104927072 | 9/2015 |
| CN | 105073708 | 11/2015 |
| JP | 2005-336244 | 12/2005 |
| JP | 2009-286877 A | 12/2009 |
| JP | 2010-070721 | 4/2010 |
| JP | 2010-77184 A | 4/2010 |
| WO | 00/13058 A1 | 3/2000 |
| WO | 2012/124664 A1 | 9/2012 |
| WO | 2015/122032 A1 | 8/2015 |

OTHER PUBLICATIONS

International Preliminary Report on Patentability Application No. PCT/JP2016/077562, dated Mar. 27, 2018.

Peng et al., *Introduction to High-Tech Fibers* (1st Edition), China Textile Press, Mar. 31, 2012.

* cited by examiner

POLYIMIDE RESIN AND POLYIMIDE FILM

TECHNICAL FIELD

The present invention relates to a polyimide resin and a polyimide film.

BACKGROUND ART

Recently, with the advent of a highly information-based society, materials satisfying both heat resistance and transparency have become desired in the field of optical communications including optical fibers, optical waveguides, etc., and in the field of display devices including liquid-crystal orientation films, color filters, etc.

In the field of display devices, an alternative technology of employing plastic substrates that are lightweight and are excellent in flexibility, in place of glass substrates, and a development of displays capable of being bent or rolled up are now under way. However, for example, when an electronic element composed of an inorganic material is formed on a film, the film having the inorganic element formed thereon may warp and, as the case may be, the inorganic element may often peel away from the film, since the inorganic material and the film significantly differ in the coefficient of linear thermal expansion. Accordingly, it is desired to develop a resin material for films having both transparency and heat resistance and having a low coefficient of linear thermal expansion.

Polyimide has not only excellent heat resistance but also other excellent properties in mechanical characteristics, chemical resistance, electric characteristics and the like, and therefore films formed by using polyimide as a material are widely used in various fields of molding materials, composite materials, electric and electronic components, display devices, etc. However, those films are further required to have higher transparency and dimensional stability than ever.

In general, it is known that polyimides having the polymer chains which are more rigid and have a higher linearity have a lower coefficient of linear thermal expansion, and for improving the dimensional stability of polyimides by lowering the coefficient of linear thermal expansion thereof, various structures of both acid dianhydrides and diamines that are raw materials of polyimides have heretofore been proposed.

For example, PTL 1 discloses a polyimide having 1,2,3,4-cyclobutanetetracarboxylic acid dianhydride (hereinafter also referred to as "CBDA") as an acid dianhydride component and 4,4'-bis(4-aminophenoxy)biphenyl as a diamine component.

PTL 2 discloses a polyimide having CBDA as an acid dianhydride and bis(4-aminophenyl) terephthalate (hereinafter also referred to as "BAPT") as a diamine component.

CITATION LIST

Patent Literature

PTL 1: JP 2009-286877 A
PTL 2: JP 2010-077184 A

SUMMARY OF INVENTION

Technical Problem

However, even both the polyimides of PTLs 1 and 2 are still difficult to well satisfy both excellent transparency and a low coefficient of linear thermal expansion that would be required in future.

From the above, a first object of the present invention is to provide a polyimide resin capable of forming a polyimide film excellent in transparency and having a low coefficient of linear thermal expansion.

Some polyimide films using the polyimides disclosed in PTLs 1 and 2 have a relatively high coefficient of linear thermal expansion, that is, all the polyimide films are not always have a low coefficient of linear thermal expansion.

From the above, a second object of the present invention is to provide a polyimide film having a lower coefficient of linear thermal expansion.

Solution to Problem

<1> The present inventors have found that a polyimide resin containing a combination of specific repeating structural units can solve the above-mentioned first problem, thereby completing a first aspect of the present invention.

Specifically, the first aspect of the present invention relates to the following [1] to [3]:

[1] A polyimide resin containing a structural unit represented by the following formula (1-1) and containing at least one selected from the group consisting of a structural unit represented by the following formula (2) and a structural unit represented by the following formula (3):

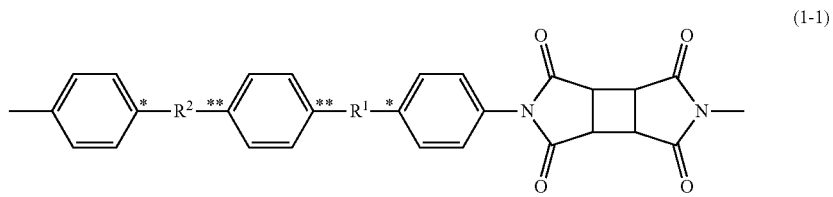

(1-1)

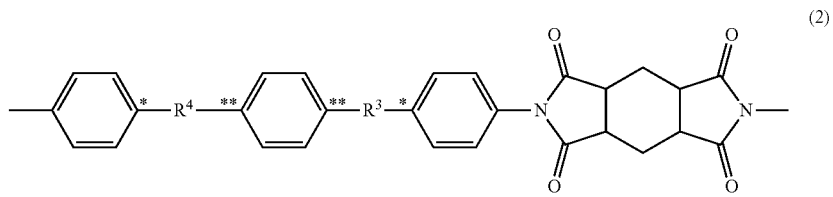

(2)

-continued (3)

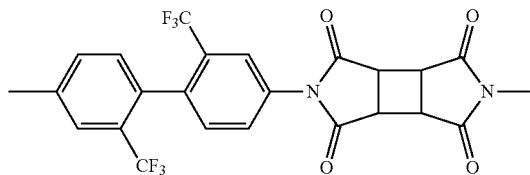

wherein $R^1$ and $R^2$ in the formula (1-1), and $R^3$ and $R^4$ in the formula (2) each independently represent a group of any of the following formulae (i) to (iv), and in these formulae, * bonds to the carbon with * in the formula (1-1) and the formula (2) and  bonds to the carbon with  in the formula (1-1) and the formula (2).

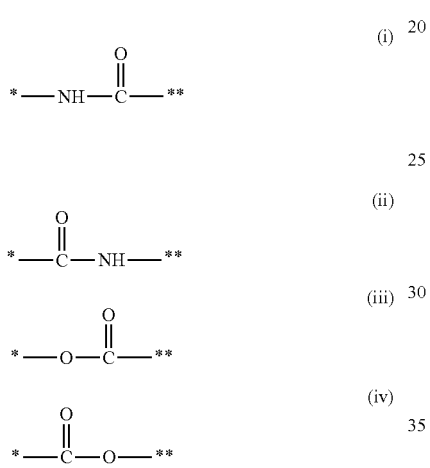

[2] A polyimide film containing the above-mentioned polyimide resin.

[3] A laminate including a substrate selected from a plastic film, a silicon wafer, a metal foil and glass, and a polyimide resin layer containing the above-mentioned polyimide resin.

<2> The present inventors have found that a polyimide film containing a polyimide resin that contains a specific structural unit can solve the above-mentioned second problem, thereby completing a second aspect of the present invention.

Specifically, the second aspect of the present invention is a polyimide film containing a structural unit represented by the following formula (1-2) and having a thickness of 10 to 50 μm.

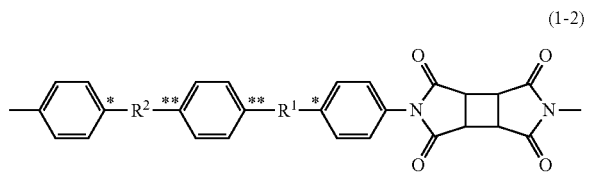

(1-2)

In the formula (1-2), $R^1$ and $R^2$ each independently represent a group of the following formula (i) or formula (ii), and in these formulae, * bonds to the carbon with * in the formula (1-2) and  bonds to the carbon with  in the formula (1-2).

(i)

\*—NH—C(=O)—\*\*

(ii)

\*—C(=O)—NH—\*\*

Advantageous Effects of Invention

The polyimide resin of the first aspect of the present invention is excellent in transparency and has a low coefficient of linear thermal expansion, and is therefore favorable for films for members that are especially required to have dimensional stability.

The polyimide film of the second aspect of the present invention has a lower coefficient of linear thermal expansion than before and is therefore favorable for films for members that are especially required to have dimensional stability and also for flexible films as alternatives to glass substrates.

The polyimide resin of the first aspect of the present invention and the polyimide film of the second aspect of the present invention are expected to be used, for example, for color filters, flexible displays, semiconductor parts, optical members, etc.

DESCRIPTION OF EMBODIMENTS

The first aspect and the second aspect of the present invention are described in detail hereinunder. In description common to both these first and second aspects of the present invention, the first and second aspects of the present invention will be referred to as "the present invention", but in description individually relating to the first and the second aspects of the present invention, these are referred to as "the first aspect of the present invention" and "the second aspect of the present invention".

[Polyimide Resin of First Aspect of Invention]

The polyimide resin of the first aspect of the present invention contains a structural unit represented by the following formula (1-1) and contains at least one selected from the group consisting of a structural unit represented by the following formula (2) and a structural unit represented by the following formula (3):

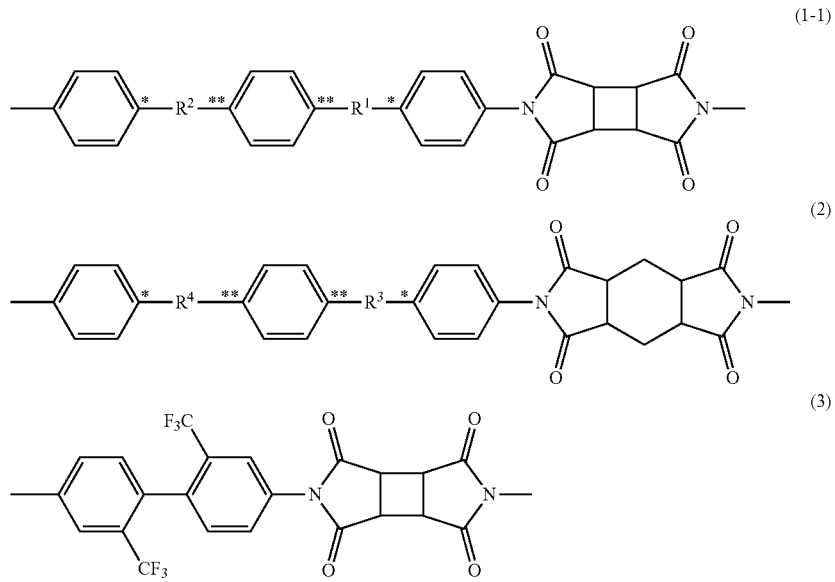

wherein R¹ and R² in the formula (1-1), and R³ and R⁴ in the formula (2) each independently represent a group of any of the following formulae (i) to (iv), and in these formulae, * bonds to the carbon with * in the formula (1-1) and the formula (2) and  bonds to the carbon with  in the formula (1-1) and the formula (2).

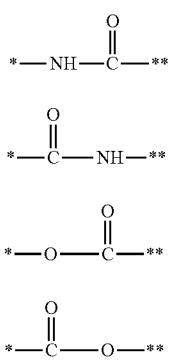

From the viewpoint of more lowering the coefficient of linear thermal expansion, preferably, R¹ and R² in the structural unit represented by the formula (1-1) each are the formula (i) and R³ and R⁴ in the structure unit represented by the formula (2) each are the formula (i), or R¹ and R² in the structural unit represented by the formula (1-1) each are the formula (i) and R³ and R⁴ in the structure unit represented by the formula (2) each are the formula (iii), or R¹ and R² in the structural unit represented by the formula (1-1) each are the formula (iii) and R³ and R⁴ in the structure unit represented by the formula (2) each are the formula (i).

From the viewpoint of lowering the yellow index (YI), the structural unit represented by the formula (2) preferably contains at least a structural unit represented by the following formula (2-1), and is more preferably the structural unit represented by the formula (2-1).

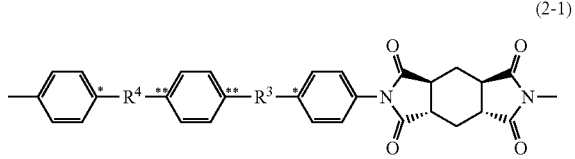

R³ and R⁴, and * and ** in the formula (2-1) have the same meanings as those in the formula (2).

The molar ratio of the structural unit represented by the formula (1-1) to the structural unit represented by the formula (2) (structural unit represented by the formula (1-1)/structural unit represented by the formula (2)) is preferably from 25/75 to 75/25, more preferably from 30/70 to 70/30, even more preferably from 40/60 to 60/40. When the molar ratio is 25/75 to 75/25, a polyimide film satisfying all of YI: 27 or less (preferably 20 or less), total light transmittance: 80% or more, and CTE: 15 ppm or less can be produced. Within the above-mentioned molar ratio range, the structural unit represented by the formula (3) may be appropriately contained.

In the first aspect of the present invention containing the structural unit represented by the formula (3), the molar ratio of the structural unit represented by the formula (1-1) to the structural unit represented by the formula (3) (structural unit represented by the formula (1-1)/structural unit represented by the formula (3)) is preferably from 20/80 to 80/20, more preferably from 25/75 to 75/25, even more preferably from 30/70 to 70/30. When the molar ratio is 20/80 to 80/20, a polyimide film satisfying all of YI: 27 or less (preferably 20 or less), total light transmittance: 80% or more, and CTE: 15 ppm or less can be produced. Within the above-mentioned molar ratio range, the structural unit represented by the formula (2) may be appropriately contained.

In the case where the resin contains the structural units represented by the formula (1-1), the formula (2) and the formula (3), the molar ratio of the total of the structural unit represented by the formula (1-1) and the structural unit represented by the formula (2) (total of the structural units of the formula (1-1) and the formula (2)) to the structural unit represented by the formula (3) (total of the structural units of the formula (1-1) and the formula (2)/structural unit represented by the formula (3)) is preferably from 100/0 to 10/90, more preferably from 100/0 to 20/80, even more preferably from 100/0 to 30/70.

Similarly, the molar ratio of the total of the structural unit represented by the formula (1-1) and the structural unit represented by the formula (3) (total of the structural units of the formula (1-1) and the formula (3)) to the structural unit represented by the formula (2) (total of the structural units of the formula (1-1) and the formula (3)/structural unit represented by the formula (2)) is preferably from 100/0 to 10/90, more preferably from 100/0 to 20/80, even more preferably from 100/0 to 30/70.

Also when the molar ratios each are as in the abovementioned proportion, a polyimide film satisfying all of YI: 27 or less (preferably 20 or less), total light transmittance: 80% or more, and CTE: 15 ppm or less can be produced.

The polyimide resin of the first aspect of the present invention may optionally contain a structural unit represented by the following general formula (4):

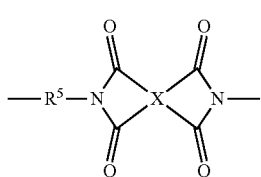
(4)

In the general formula (4), X represents a tetravalent group containing an aromatic ring and having a carbon number of 6 to 22. Having X that contains an aromatic ring, the polyimide resin of the present invention has an especially low coefficient of linear thermal expansion and is excellent in transparency and heat resistance.

X may have at least one aromatic ring. The aromatic ring may be a single ring or a condensed ring, and examples thereof include a benzene ring, a naphthalene ring, an anthracene ring, and a tetracene ring. Among these, a benzene ring and a naphthalene ring are preferred, and a benzene ring is more preferred.

The carbon number of X is from 6 to 22, and preferably from 6 to 18, more preferably from 6 to 12.

From the viewpoint of the transparency, the heat resistance and the low coefficient of linear thermal expansion of the polyimide resin, X is preferably at least one selected from tetravalent groups represented by the following general formulae (X-1) to (X-3), and is more preferably a tetravalent group represented by the general formula (X-3).

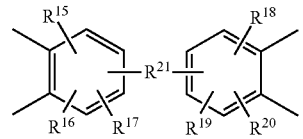
(X-1)
(X-2)

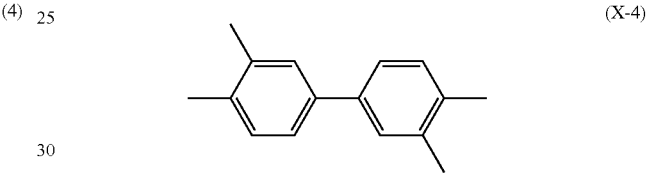
(X-3)

$R^9$ to $R^{20}$ each independently represent a hydrogen atom, a halogen atom, an alkyl group having a carbon number of 1 to 6, or a halogenoalkyl group. $R^{21}$ represents a single bond, —CH$_2$—, —C(CH$_3$)$_2$—, —O—, —S—, —SO$_2$—, —CONH—, —CO—, or —C(CF$_3$)$_2$—.

In the general formulae (X-1) to (X-3), $R^9$ to $R^{20}$ each are preferably a hydrogen atom or a methyl group, more preferably a hydrogen atom. In the general formula (X-3), $R^{21}$ is preferably a single bond, —CH$_2$— or —C(CH$_3$)$_2$—, more preferably a single bond. From the viewpoint of the low coefficient of linear thermal expansion, X is more preferably a tetravalent group represented by the following structural formula (X-4).

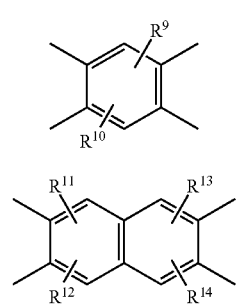
(X-4)

In the general formula (4), a divalent organic group of $R^5$ includes a divalent organic group derived from an aromatic diamine compound containing 6 to 28 carbon atoms, or a divalent organic group derived from an aliphatic diamine compound containing 2 to 28 carbon atoms.

As the aromatic diamine compound, for example, there are exemplified aromatic diamine compounds such as p-phenylenediamine, m-phenylenediamine, 4,4'-diaminobiphenyl, 4,4'-diamino-2,2'-dimethylbiphenyl, 4,4'-diamino-3,3'-dimethylbiphenyl, 4,4'-diamino-2,2'-ditrifluoromethylbiphenyl, 4,4'-diaminodiphenyl ether, 3,4'-diaminodiphenyl ether, 4,4'-diaminodiphenylmethane, 4,4'-diaminobenzophenone, 4,4'-diaminodiphenyl sulfone, 4,4'-diaminodiphenyl sulfide, 1,4-bis(4-aminophenoxy)benzene, 1,3-bis(4-aminophenoxy)benzene, 4,4'-bis(4-aminophenoxy)biphenyl, bis[4-(4-aminophenoxy)phenyl] sulfone, 2,2-bis[4-(4-aminophenoxy)phenyl]propane, 2,2-bis[4-(4-aminophenoxy)phenyl]-1,1,1,3,3,3-hexafluoropropane, bis[4-(3-aminophenoxy)phenyl] sulfone, 9,9-bis(4-aminophenyl)fluorenone, etc.

As the aliphatic diamine compound, for example, there are exemplified aliphatic diamine compounds such as ethylenediamine, hexamethylenediamine, polyethylene glycol bis(3-aminopropyl) ether, polypropylene glycol bis(3-aminopropyl) ether, 1,3-bis(aminomethyl)cyclohexane, 1,4-bis(aminomethyl)cyclohexane, 4,4'-diaminodicyclohexylmethane, 3(4), 8(9)-bis(aminomethyl)-tricyclo[5.2.1.0$^{2,6}$]decane, metaxylylenediamine, paraxylylenediamine, isophoronediamine, norbornanediamine, siloxanediamines, etc.

One of them may be used singly or two or more thereof may be mixed and used. Among these diamine compounds, preferred aromatic diamine compounds are 4,4'-diamino-3,3'-dimethylbiphenyl, 4,4'-diamino-2,2'-ditrifluoromethylbiphenyl, 4,4'-diaminodiphenyl ether, 4,4'-diaminodiphenylmethane, 1,4-bis(4-aminophenoxy)benzene, 1,3-bis(4- aminophenoxy)benzene, 4,4'-bis(4-aminophenoxy) biphenyl, 2,2-bis[4-(4-aminophenoxy)phenyl]propane and 2,2-bis[4-(4-aminophenoxy)phenyl]-1,1,1,3,3,3-hexafluoropropane, and preferred aliphatic diamine compounds are 4,4'-diaminodicyclohexylmethane and 3(4), 8(9)-bis(aminomethyl)-tricyclo[5.2.1.0$^{2,6}$]decane.

The total content of the structural unit represented by the general formula (1-1) and the structural unit represented by the general formula (2), the total content of the structural unit represented by the general formula (1-1) and the structural unit represented by the general formula (3), or the total content of the structural unit represented by the general formula (1-1), the structural unit represented by the general formula (2) and the structural unit represented by the general formula (3), relative to all the structural units constituting the polyimide of the first aspect of the present invention, is preferably from 50 to 100 mol %, more preferably from 75 to 100 mol %, even more preferably from 90 to 100 mol %, further more preferably 100 mol %.

The number-average molecular weight of the polyimide resin of the first aspect of the present invention is, from the viewpoint of the mechanical strength of the polyimide film to be obtained, preferably from 5,000 to 100,000. The number-average molecular weight of the polyimide resin may be measured through gel filtration chromatography, etc.

[Polyimide Resin of Second Aspect of Invention]

The polyimide film of the second aspect of the present invention contains a polyimide resin containing a specific structural unit and has a thickness of 10 to 50 μm. The polyimide resin is hereinafter referred to as "the polyimide resin in the second aspect of the present invention".

The polyimide resin in the second aspect of the present invention contains a structural unit represented by the following formula (1-2):

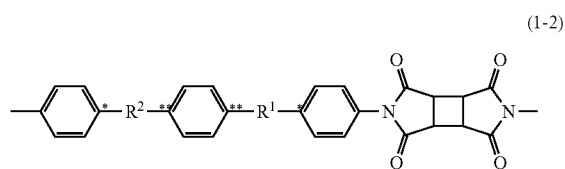

(1-2)

wherein R$^1$ and R$^2$ each independently represent a group of the following formula (i) or formula (ii), and in these formulae, * bonds to the carbon with * in the formula (1-2) and  bonds to the carbon with  in the formula (1-2).

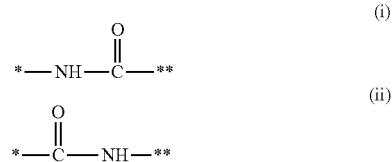

From a practical point of view, R$^1$ and R$^2$ in the structural unit represented by the above formula (1-2) each are preferably the formula (i). Also from the viewpoint of lowering CTE, the polyimide resin in the second aspect of the present invention is preferably so constituted that R$^1$ and R$^2$ in the formula (1-2) each are the formula (i).

From the viewpoint of lowering the yellow index (YI) of the film, the polyimide resin preferably contains at least one selected from the group consisting of a structural unit represented by the formula (2) and a structural unit represented by the formula (3).

In the second aspect of the present invention, the structural unit represented by the formula (2) and the structural unit represented by the formula (3) are the same as the structural unit represented by the formula (2) and the structural unit represented by the formula (3), respectively, described in the explanation relating to the polyimide resin of the first aspect of the present invention, and the description thereof is omitted.

From a practical point of view, R$^3$ and R$^4$ in the structural unit represented by the formula (2) each are preferably the formula (i).

Further, in the second aspect of the present invention, from the viewpoint of more lowering the yellow index (YI), the structural unit represented by the formula (2) preferably contains at least a structural unit represented by the above-mentioned formula (2-1), and is more preferably the structural unit represented by the formula (2-1).

In the second aspect of the present invention, the structural unit represented by the above-mentioned formula (2-1) is the same as the structural unit represented by the formula (2-1) described in the explanation relating to the polyimide resin of the first aspect of the present invention and the description thereof is therefore omitted.

In the case where the polyimide resin contains a structural unit represented by the formula (2), the molar ratio of the structural unit represented by the formula (1-2) to the structural unit represented by the formula (2) (structural unit represented by the formula (1-2)/structural unit represented by the formula (2)) is preferably from 25/75 to 75/25, more preferably from 30/70 to 70/30, even more preferably from 40/60 to 60/40. When the molar ratio is from 25/75 to 75/25, a polyimide film satisfying all of YI: 27 or less (preferably 20 or less), total light transmittance: 80% or more and CTE: 15 ppm or less can be produced.

Within the above-mentioned ratio range, the structural unit represented by the formula (3) may be appropriately contained.

In the case where the resin contains the structural unit represented by the formula (3), the molar ratio of the structural unit represented by the formula (1-2) to the structural unit represented by the formula (3) (structural unit represented by the formula (1-2)/structural unit represented by the formula (3)) is preferably from 20/80 to 80/20, more preferably from 25/75 to 75/25, even more preferably from 30/70 to 70/30. When the molar ratio is 20/80 to 80/20, a polyimide film satisfying all of YI: 27 or less (preferably 20 or less), total light transmittance: 80% or more and CTE: 15 ppm or less can be produced.

Within the above-mentioned ratio range, the structural unit represented by the formula (2) may be appropriately contained.

The molar ratio of the total of the structural unit represented by the formula (1-2) and the structural unit represented by the formula (2) (total of the structural units of the formula (1-2) and the formula (2)) to the structural unit represented by the formula (3) (total of the structural units of the formula (1-2) and the formula (2)/structural unit of the formula (3)) is preferably from 100/0 to 10/90, more preferably from 100/0 to 20/80, even more preferably from 100/0 to 30/70.

Similarly, the molar ratio of the total of the structural unit represented by the formula (1-2) and the structural unit represented by the formula (3) (total of the structural units of the formula (1-2) and the formula (3)) to the structural unit represented by the formula (2) (total of the structural units of the formula (1-2) and the formula (3)/structural unit represented by the formula (2)) is preferably from 100/0 to 10/90, more preferably from 100/0 to 20/80, even more preferably from 100/0 to 30/70.

Also when the molar ratios each are as in the above-mentioned proportion, a polyimide film satisfying all of YI: 27 or less (preferably 20 or less), total light transmittance: 80% or more, and CTE: 15 ppm or less can be produced.

The polyimide resin in the second aspect of the present invention may optionally contain a structural unit represented by the above-mentioned general formula (4).

In the second aspect of the present invention, the general formula (4) is the same as the general formula (4) described in the explanation relating to the polyimide resin of the first aspect of the present invention, and therefore the description thereof is omitted.

The total content of the structural unit represented by the general formula (1-2) and the structural unit represented by the general formula (2), the total content of the structural unit represented by the general formula (1-2) and the structural unit represented by the general formula (3), or the total content of the structural unit represented by the general formula (1-2), the structural unit represented by the general formula (2) and the structural unit represented by the general formula (3), relative to all the constituent units constituting the polyimide resin in the second aspect of the present invention, is preferably from 50 to 100 mol %, more preferably from 75 to 100 mol %, even more preferably from 90 to 100 mol %, and further more preferably 100 mol %.

The number-average molecular weight of the polyimide resin in the second aspect of the present invention is, from the viewpoint of the mechanical strength of the polyimide film to be obtained, preferably from 5,000 to 100,000. The number-average molecular weight of the polyimide resin may be measured through gel filtration chromatography, etc.

[Production of Polyimide Resin]

The polyimide resin of the present invention can be produced by reacting a specific tetracarboxylic acid component with a specific diamine component.

In the first aspect of the present invention, the tetracarboxylic acid component contains 1,2,3,4-cyclobutanetetracarboxylic acid dianhydride indispensably, and in the case of containing a structural unit of the formula (2), further contains 1,2,4,5-cyclohexanetetracarboxylic acid dianhydride. If necessary, the component may contain an aromatic ring-containing tetracarboxylic acid or a derivative thereof.

In the first aspect of the present invention, the diamine component contains at least one selected from the group consisting of N,N'-bis(4-aminophenyl)terephthalamide (DATA), bis(4-aminophenyl) terephthalate (BAPT), 1,4-bis(4-aminobenzoyloxy)benzene (BABB) and N,N'-p-phenylenebis(p-aminobenzamide) (PABA) indispensably, and in the case of containing a structural unit of the formula (3), further contains 2,2'-bis(trifluoromethyl)-4,4'-diaminobiphenyl (TFMB).

In the second aspect of the present invention, the tetracarboxylic acid component contains 1,2,3,4-cyclobutanetetracarboxylic acid dianhydride indispensably, preferably, further contains 1,2,4,5-cyclohexanetetracarboxylic acid dianhydride, and if desired, contains an aromatic ring-containing tetracarboxylic acid or a derivative thereof.

In the second aspect of the present invention, the diamine component contains, for example, N,N'-bis(4-aminophenyl) terephthalamide (DATA) or N,N'-p-phenylenebis(p-aminobenzamide) (PABA) indispensably, and preferably, further contains 2,2'-bis(trifluoromethyl)-4,4'-diaminobiphenyl (TFMB), and in the case where 1,2,4,5-cyclohexanetetracarboxylic acid dianhydride is used as the tetracarboxylic acid component, the diamine component preferably contains bis(4-aminophenyl) terephthalate (BAPT) or 1,4-bis(4-aminobenzoyloxy)benzene (BABB) according thereto.

Among the above-mentioned tetracarboxylic acid components, the synthesis method for 1,2,3,4-cyclobutanetetracarboxylic acid dianhydride (CBDA) is not specifically limited and may be any synthesis method known to those skilled in the art, and for example, there is mentioned a method of synthesizing the compound in one stage through photocyclization (dimerization) of maleic anhydride.

As the synthesis method for CBDA, for example, methods disclosed in Journal of Polymer Science: Part A: Polymer Chemistry, Vol. 38, 108-116, 2001, JP 59-212495 A, JP 2003-192685 A, JP 2006-328027 A and others are known. In this connection, every CBDA obtained according to these synthesis methods is a cis-trans-cis form.

The raw materials for synthesizing CBDA are easily and inexpensively available, and CBDA is easy to synthesize. Consequently, usefulness of using CBDA as a raw material for polyimide is great.

Among the above-mentioned tetracarboxylic acid components, 1,2,4,5-cyclohexanetetracarboxylic acid is a compound represented by the following formula (A) (where Xa represents a tetravalent cyclohexane group), which includes isomers where Xa is any of the following formulae (a) to (f) in terms of the steric structures. Any of these cyclohexanetetracarboxylic acids are usable, but above all, 1,2,4,5-cyclohexanetetracarboxylic acid (hereinafter also referred to as "PMDA-HH") where Xa is the formula (b) is preferred from the viewpoint of lowering YI.

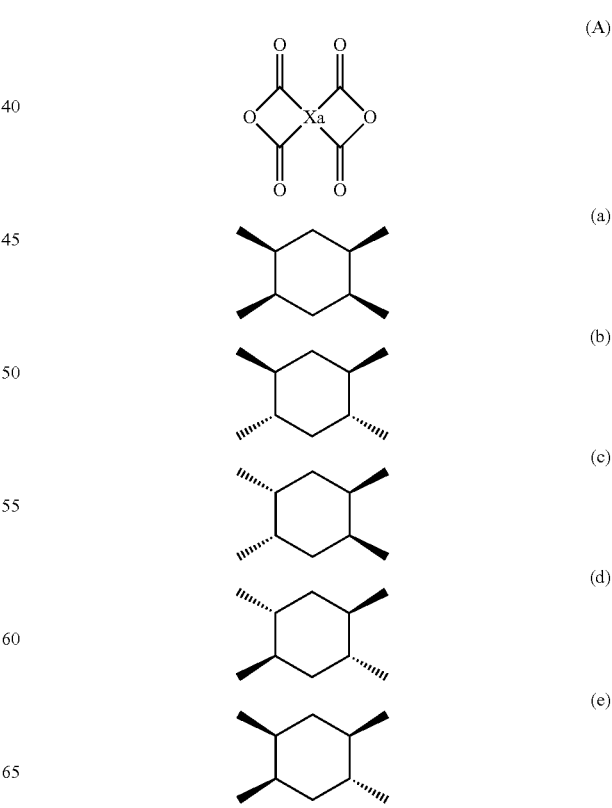

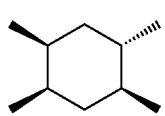
(f)

PMDA-HH can be synthesized, for example, through isomerization of heating 1,2,4,5-cyclohexanetetracarboxylic acid of a cis-cis-cis form (corresponding to the above-mentioned formula (A) where Xa is the formula (a)), which is obtained according to a known method, in the presence of an alkali.

Among the above-mentioned tetracarboxylic acid component, the tetracarboxylic acid containing an aromatic ring is preferably a compound with four carboxyl groups directly bonding to the aromatic ring therein, and may contain an alkyl group in the structure thereof. The tetracarboxylic acid preferably has a carbon number of from 10 to 26. The tetracarboxylic acid includes pyromellitic acid, 3,3',4,4'-diphenylsulfonetetracarboxylic acid, 3,3',4,4'-benzophenone tetracarboxylic acid, 4,4'-oxydiphthalic acid, 2,2',3,3'-benzophenonetetracarboxylic acid, 3,3',4,4'-biphenyltetracarboxylic acid, 2,2',3,3'-biphenyltetracarboxylic acid, 2,2-bis(3,4-dicarboxyphenyl)propane, 2,2-bis(2,3-dicarboxyphenyl)propane, 2,2-bis(3,4-dicarboxyphenoxyphenyl)propane, 1,1-bis(2,3-dicarboxyphenyl)ethane, 1,2-bis(2,3-dicarboxyphenyl)ethane, 1,1-bis(3,4-dicarboxyphenyl)ethane, 1,2-bis(3,4-dicarboxyphenyl)ethane, bis(2,3-dicarboxyphenyl)methane, bis(3,4-dicarboxyphenyl)methane, 4,4'-(p-phenylenedioxy)diphthalic acid, 4,4'-(m-phenylenedioxy)diphthalic acid, 2,3,6,7-naphthalenetetracarboxylic acid, 1,4,5,8-naphthalenetetracarboxylic acid, etc.

Derivatives of the tetracarboxylic acid containing an aromatic ring include anhydrides and alkyl esters of the tetracarboxylic acid. The tetracarboxylic acid derivative is preferably one having a carbon number of from 10 to 38. Anhydrides of the tetracarboxylic acid containing an aromatic ring include pyromellitic acid monoanhydride, pyromellitic acid dianhydride, 3,3',4,4'-diphenylsulfonetetracarboxylic dianhydride, 3,3',4,4'-benzophenonetetracarboxylic dianhydride, 4,4'-oxydiphthalic dianhydride, 2,2',3,3'-benzophenonetetracarboxylic dianhydride, 3,3',4,4'-biphenyltetracarboxylic dianhydride, 2,2',3,3'-biphenyltetracarboxylic dianhydride, 2,2-bis(3,4-dicarboxyphenyl)propane dianhydride, 2,2-bis(2,3-dicarboxyphenyl)propane dianhydride, 2,2-bis(3,4-dicarboxyphenoxyphenyl)propane dianhydride, 1,1-bis(2,3-dicarboxyphenyl)ethane dianhydride, 1,2-bis(2,3-dicarboxyphenyl)ethane dianhydride, 1,1-bis(3,4-dicarboxyphenyl)ethane dianhydride, 1,2-bis(3,4-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)diphthalic dianhydride, 4,4'-(m-phenylenedioxy)diphthalic dianhydride, 2,3,6,7-naphthalenetetracarboxylic dianhydride, 1,4,5,8-naphthalenetetracarboxylic dianhydride, etc.

Alkyl esters of the tetracarboxylic acid containing an aromatic ring are preferably those in which the carbon number of the alkyl is from 1 to 3. For example, there are mentioned dimethyl esters, diethyl esters and dipropyl esters of the above-mentioned, aromatic ring-containing tetracarboxylic acids.

As the aromatic ring-containing tetracarboxylic acid or the derivative thereof, one selected from the above may be used singly, or two or more compounds thereof may be used in combination.

Of the above-mentioned aromatic ring-containing tetracarboxylic acid components, preferred are one or more selected from pyromellitic acid, 2,3,5,6-toluenetetracarboxylic acid, 3,3',4,4'-biphenyltetracarboxylic acid, 1,4,5,8-naphthalenetetracarboxylic acid and dianhydrides thereof, and from the viewpoint of the transparency, the heat resistance and the low coefficient of linear thermal expansion, more preferred are 3,3',4,4'-biphenyltetracarboxylic acid and dianhydride thereof.

The tetracarboxylic acid component for use in the polyimide resin of the present invention may contain any other tetracarboxylic acid component not containing an aromatic ring, except 1,2,3,4-cyclobutanetetracarboxylic acid dianhydride and 1,2,4,5-cyclohexanetetracarboxylic acid, within a range not detracting from various physical properties of the polyimide resin. The tetracarboxylic acid component of the type includes 1,2,3,4-butanetetracarboxylic acid, 1,2,3,4-pentanetetracarboxylic acid, derivatives thereof, etc. The amount to be used of the tetracarboxylic acid component is preferably 10 mol % or less, more preferably 5 mol % or less, even more preferably 1 mol % or less, relative to all the tetracarboxylic acid components used.

The diamine component for use for the polyimide resin of the first aspect of the present invention contains, as described above, indispensably at least one selected from the group consisting of N,N'-bis(4-aminophenyl)terephthalamide (DATA), bis(4-aminophenyl) terephthalate (BAPT), 1,4-bis(4-aminobenzoyloxy)benzene (BABB) and N,N'-p-phenylenebis(p-aminobenzamide) (PABA), and in the case of containing a structural unit of the formula (3), further contains 2,2'-bis(trifluoromethyl)-4,4'-diaminobiphenyl (TFMB).

The diamine component for use for the polyimide resin in the second aspect of the present invention contains, as described above, indispensably N,N'-bis(4-aminophenyl)terephthalamide (DATA) or N,N'-p-phenylenebis(p-aminobenzamide) (PABA), and preferably further contains 2,2'-bis(trifluoromethyl)-4,4'-diaminobiphenyl (TFMB), and in the case of using 1,2,4,5-cyclohexanetetracarboxylic acid dianhydride as the tetracarboxylic acid component, preferably contains bis(4-aminophenyl) terephthalate (BAPT) or 1,4-bis(4-aminobenzoyloxy)benzene (BABB) according thereto.

The diamine component for use in the polyimide resin of the present invention may contain any other diamine component than the above-mentioned diamines, within a range not detracting from various physical properties of the polyimide resin. The other diamine is not specifically limited, and examples thereof include an aliphatic diamine, an aromatic ring-containing diamine, etc. From the viewpoint of the heat resistance of the polyimide resin, preferred are aromatic ring-containing diamines.

As the aliphatic diamine, alicyclic hydrocarbon structure-containing diamines and chain aliphatic diamines are exemplified, and for example, 1,2-bis(aminomethyl)cyclohexane, 1,3-bis(aminomethyl)cyclohexane, 1,4-bis(aminomethyl)cyclohexane, 1,2-cyclohexanediamine, 1,3-cyclohexanediamine, 1,4-cyclohexanediamine, 4,4'-diaminodicyclohexylmethane, 4,4'-methylenebis(2-methylcyclohexylamine), carbondiamine, limonenediamine, isophoronediamine, norbornanediamine, bis(aminomethyl)tricyclo[5.2.1.0$^{2,6}$]decane, 3,3'-dimethyl-4,4'-diaminodicyclohexylmethane, 4,4'-diaminodicyclohexylpropane, 1,5-pentamethylenediamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 2,2'-(ethylenedioxy) bis(ethyleneamine), etc. are exemplified.

As the aromatic ring-containing diamine, exemplified are orthoxylylenediamine, metaxylylenediamine, paraxylylenediamine, 1,2-diethynylbenzenediamine, 1,3-diethynylbenzenediamine, 1,4-diethynylbenzenediamine, 1,2-diaminobenzene, 1,3-diaminobenzene, 1,4-diaminobenzene, 4,4'-diaminodiphenyl ether, 3,4'-diaminodiphenyl ether, 4,4'-diaminodiphenyl methane, α,α'-bis(4-aminophenyl)-1,4-diisopropylbenzene, α,α'-bis(3-aminophenyl)-1,4-diisopropylbenzene, 2,2-bis[4-(4-aminophenoxy)phenyl]propane, 2,6-diaminonaphthalene, 1,5-diaminonaphthalene, 4,4'-diaminobenzanilide, 3,4'-diaminobenzanilide, etc.

One of the above-mentioned diamine components may be used singly or two or more thereof may be used in combination.

The amount to be used of the other diamine component is 20 mol % or less, preferably 10 mol % or less, more preferably 5 mol % or less, even more preferably 1 mol % or less, relative to all the diamine components.

In producing the polyimide resin of the present invention, the amount ratio of the tetracarboxylic acid component and the diamine component to be charged is preferably such that the amount of the diamine component is from 0.9 to 1.1 mol relative to 1 mol of the tetracarboxylic acid component.

In producing the polyimide resin of the present invention, a terminal blocking agent may be used in addition to the above-mentioned tetracarboxylic acid components and the above-mentioned diamine component. The terminal blocking agent is preferably a monoamine or a dicarboxylic acid. The charged amount of the terminal blocking agent to be introduced is preferably from 0.0001 to 0.1 mol, more preferably from 0.001 to 0.06 mol, relative to 1 mol of the tetracarboxylic acid component. As the monoamine terminal blocking agent, for example, recommended are methylamine, ethylamine, propylamine, butylamine, benzylamine, 4-methylbenylamine, 4-ethylbenzylamine, 4-dodecylbenzylamine, 3-methylbenzylamine, 3-ethylbenzylamine, aniline, 3-methylaniline, 4-methylaniline, etc. Of those, preferred for use herein are benzylamine and aniline. As the dicarboxylic acid terminal blocking agent, preferred are dicarboxylic acids, which may be partially ring-closed. As the dicarboxylic acid, for example, recommended are phthalic acid, phthalic anhydride, 4-chlorophthalic acid, tetrafluorophthalic acid, 2,3-benzophenone dicarboxylic acid, 3,4-benzophenone dicarboxylic acid, cyclohexane-1,2-dicarboxylic acid, cyclopentane-1,2-dicarboxylic acid, 4-cyclohexene-1,2-dicarboxylic acid, etc. Of those, preferred for use herein are phthalic acid and phthalic anhydride.

The method for reacting the above-mentioned tetracarboxylic acid component with the above-mentioned diamine component is not specifically limited, for which employable is any known method.

As specific reaction methods, there are mentioned (1) a method which includes putting a tetracarboxylic acid component, a diamine component and a reaction solvent into a reactor, stirring them at room temperature to 80° C. for 0.5 to 30 hours, and thereafter heating them for imidation, (2) a method which includes putting a diamine component and a reaction solvent into a reactor and dissolving it in the solvent, then adding thereto a tetracarboxylic acid component, optionally stirring them at room temperature to 80° C. for 0.5 to 30 hours, and thereafter heating them for imidation, (3) a method which includes putting a tetracarboxylic acid component, a diamine component and a reaction solvent into a reactor, and then immediately heating them for imidation, and the like.

The reaction solvent for use for production of the polyimide resin may be any one capable of dissolving the produced polyimide resin, not detracting from the imidation reaction. For example, there are exemplified an aprotic solvent, a phenolic solvent, an ether solvent, a carbonate solvent, etc.

Specific examples of the aprotic solvent include amide solvents such as N,N-dimethylisobutylamide (DMIB), N,N-dimethylformamide, N,N-dimethylacetamide, N-methyl-2-pyrrolidone, N-methylcaprolactam, 1,3-dimethylimidazolidinone, tetramethylurea, etc.; lactone solvents such as γ-butyrolactone, γ-valerolactone, etc.; phosphorus-containing amide solvents such as hexamethylphosphoric amide, hexamethylphosphine triamide, etc.; sulfur-containing solvents such as dimethyl sulfone, dimethyl sulfoxide, sulfolane, etc.; ketone solvents such as acetone, cyclohexane, methylcyclohexane, etc.; amine solvents such as picoline, pyridine, etc.; ester solvents such as (2-methoxy-1-methylethyl) acetate, etc.

Specific examples of the phenolic solvent include phenol, o-cresol, m-cresol, p-cresol, 2,3-xylenol, 2,4-xylenol, 2,5-xylenol, 2,6-xylenol, 3,4-xylenol, 3,5-xylenol, etc.

Specific examples of the ether solvent include 1,2-dimethoxyethane, bis(2-methoxyethyl) ether, 1,2-bis(2-methoxyethoxy)ethane, bis[2-(2-methoxyethoxy)ethyl] ether, tetrahydrofuran, 1,4-dioxane, etc.

Specific examples of the carbonate solvent include diethyl carbonate, methylethyl carbonate, ethylene carbonate, propylene carbonate, etc.

Among those reaction solvents, an aprotic solvent is preferred, and an amide solvent or a lactone solvent is more preferred. One of these reaction solvents may be used singly or two or more thereof may be used in combination.

In the imidation, preferably, a Dean Stark apparatus or the like is used for removing water formed during the production process. Such an operation increases the degree of polymerization and the imidation ratio of the polyimide resin.

Any known imidation catalyst may be used in the imidation. As the imidation catalyst, a base catalyst and an acid catalyst are exemplified.

The base catalyst includes organic base catalysts such as pyridine, quinoline, isoquinoline, α-picoline, β-picoline, 2,4-lutidine, 2,6-lutidine, trimethylamine, triethylamine, tripropylamine, tributylamine, imidazole, N,N-dimethylaniline, N,N-diethylaniline, etc.; and inorganic base catalysts such as potassium hydroxide, sodium hydroxide, potassium carbonate, sodium carbonate, potassium hydrogencarbonate, sodium hydrogencarbonate, etc.

The acid catalyst includes crotonic acid, acrylic acid, trans-3-hexenoic acid, cinnamic acid, benzoic acid, methylbenzoic acid, oxybenzoic acid, terephthalic acid, benzenesulfonic acid, paratoluenesulfonic acid, naphthalenesulfonic acid, etc. One of these imidation catalysts may be used singly or two or more thereof may be used in combination.

Of the above, preferred is use of base catalysts from the viewpoint of the handleability thereof, more preferred is use of organic base catalysts, and even more preferred is use of triethylamine.

In the case where the above-mentioned catalyst is used, the imidation temperature is preferably from 120 to 250° C., more preferably from 160 to 190° C., from the viewpoint of the reactivity and preventing gelation. Also preferably, the reaction time after the start of distillation of the produced water is from 0.5 to 10 hours.

In the case where a catalyst is not used, the imidation temperature is preferably from 200 to 350° C.

Various additives may be added to the polyimide resin composition of the present invention within a range not detracting from the advantageous effects of the present invention to prepare a polyimide resin composition. Examples of the additives include an antioxidant, a light stabilizer, a surfactant, a flame retardant, a plasticizer, any other polymer compound than the above-mentioned polyimide resin, etc.

The solid concentration in the resin composition may be suitably selected depending on the operability in forming polyimide films and laminates to be mentioned below, and the solid concentration or the viscosity of the composition selected from the group consisting of structural units represented by the following general formula (2a) and the following general formula (3a).

In the second aspect of the present invention, the polyamide acid indispensably has a structural unit represented by the following general formula (1-2a) and contains at least one selected from the group consisting of structural units represented by the following general formula (2a) and structural units represented by the following general formula (3a).

In the first and second aspects of the present invention, a repeating structural unit represented by the following general formula (4a) may be optionally contained. The content may be suitably controlled depending on the desired polyimide composition. The other preferred embodiments are the same as those of the above-mentioned polyimide resin.

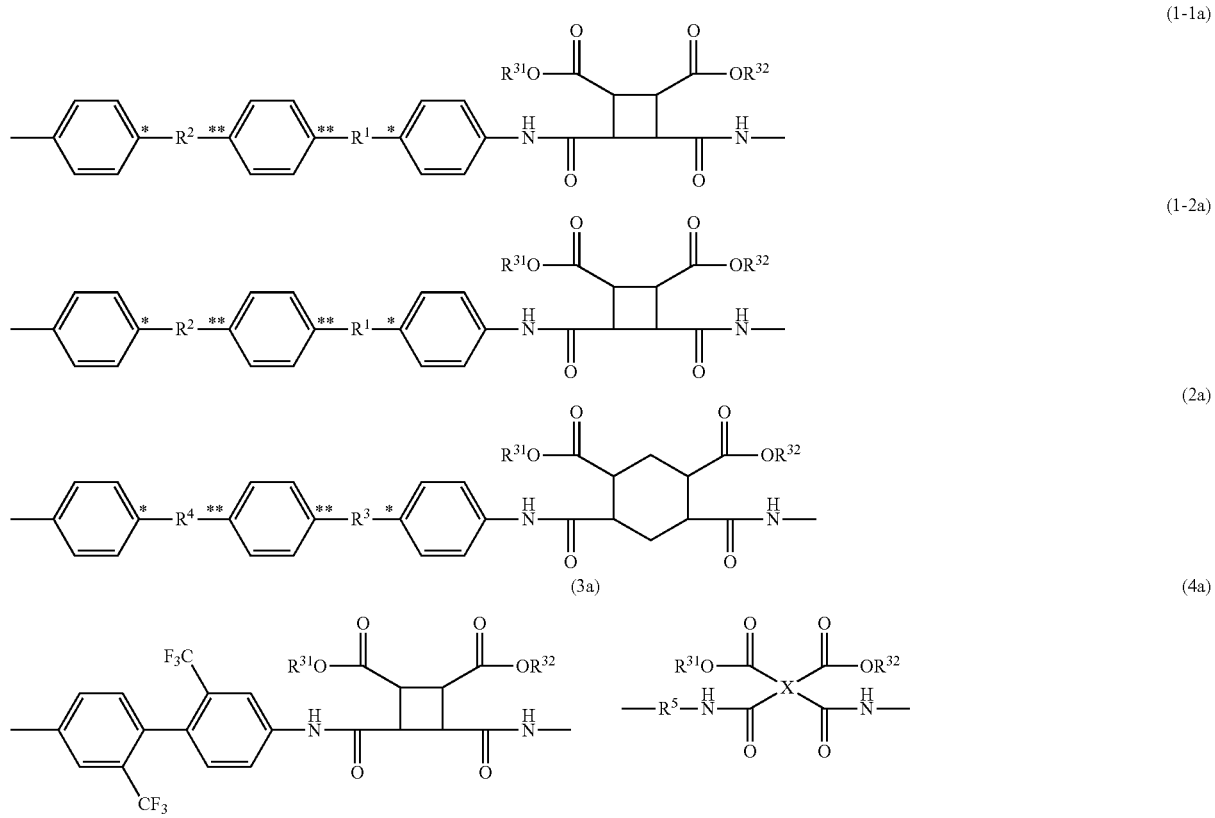

may be controlled by adding an organic solvent. The organic solvent is not specifically limited and may be any one capable of dissolving polyimide resin.

The polyimide resin of the present invention generally soluble in an organic solvent, but depending on the structure and the molecular weight thereof, the solubility of the polyimide resin in an organic solvent may be low. In such a case, from the viewpoint of the handleability and the processability, a composition containing a polyamide acid that is a precursor of the polyimide resin (that is, a polyamide acid composition to be mentioned below) may be formed into desired shapes such as films or the like, and then may be subjected to the above-mentioned imidation.

In the first aspect of the present invention, the polyamide acid indispensably has a structural unit represented by the following general formula (1-1a) and contains at least one $R^1$ and $R^2$ in the above formula (1-1a), $R^1$ and $R^2$ in above formula (1-2a), $R^3$ and $R^4$ in the above formula (2a) and X in the above formula (4a) are the same as those in the above-mentioned formula (1-1), (1-2), (2) and (4), respectively. $R^{31}$ and $R^{32}$ in the above formula (1-1a), formula (1-2a), formula (2a), formula (3a) and formula (4a) each independently represent a hydrogen atom or an alkyl group, preferably a hydrogen atom or an alkyl group having a carbon number of 1 to 3.

The polyamide acid can be obtained by reacting the above-mentioned tetracarboxylic acid component with the above-mentioned diamine component. The method for the reaction is not specifically limited, for which employable is any known method.

As specific reaction methods, there are mentioned (1) a method which includes putting a tetracarboxylic acid component, a diamine component and a solvent into a reactor, and stirring them at 0 to 120° C., preferably at 5 to 80° C. for 1 to 72 hours, (2) a method which includes putting a diamine component and a solvent into a reactor and dissolving it in the solvent, then adding thereto a tetracarboxylic acid component, and stirring them at 0 to 120° C., preferably at 5 to 80° C. for 1 to 72 hours, and the like. Of the above, preferred is the production method (2).

In the case of reaction at 80° C. or lower, the molecular weight of the resultant polyamide acid does not fluctuate depending on the temperature history in polymerization and in the case, in addition, thermal imidation can be prevented and therefore the polyamide acid can be produced stably.

The solvent for use for production of the polyamide acid may be any one capable of dissolving the produced polyamide acid. For example, there are exemplified N-methyl-2-pyrrolidone, N,N-dimethylisobutylamide, N,N-dimethylacetamide, N,N-dimethylformamide, γ-butyrolactone, γ-valerolactone, dimethyl sulfoxide, 1,4-dioxane, cyclohexanone, etc. One of these solvents may be used singly or two or more thereof may be used in combination.

In the above-mentioned production method (1), a solution prepared by dissolving a diamine component and a tetracarboxylic acid component in the above-mentioned solvent is stirred in a temperature range of from 0 to 120° C., preferably from 5 to 80° C. for 1 to 72 hours to obtain a solution containing a polyamide acid. In the production method (2), while a solution prepared by dissolving a diamine component in the above-mentioned solvent is stirred, a tetracarboxylic acid component is gradually added thereto and stirred in a temperature range of from 0 to 120° C., preferably from 5 to 80° C. for 1 to 72 hours to obtain a solution containing a polyamide acid.

The concentration of the polyamide acid in the resultant polyamide acid solution is, from the viewpoint of using the solution as a polyamide acid composition, generally within a range of from 1 to 50% by mass in the polyamide acid solution, preferably from 3 to 35% by mass, more preferably from 10 to 30% by mass.

The polyamide acid composition contains the polyamide acid produced in the manner as above. The use of the polyamide acid composition also gives the polyimide resin of the present invention. The polyamide acid composition is favorably used especially for forming polyimide films.

From the viewpoint of efficiently attaining the imidation, it is preferable that the polyamide acid composition further contains an imidation catalyst and a dehydration catalyst. The imidation catalyst may be any one having a boiling point of 40° C. or higher and 180° C. or lower, but preferred is an amine compound having a boiling point of 180° C. or lower. When the imidation catalyst having a boiling point of 180° C. or lower is used, there is no risk of discoloration of the formed films in drying at high temperatures, which causes the appearance of the films to be worsened. On the other hand, the imidation catalyst having a boiling point of 40° C. or higher can be prevented from being evaporated away before the end of sufficient imidation.

Examples of the amine compound that is used favorable as the imidation catalyst include pyridine and picoline. One of such imidation catalysts may be used singly or two or more thereof may be used in combination.

The dehydration catalyst includes acid anhydrides such as acetic anhydride, propionic anhydride, n-butyric anhydride, benzoic anhydride, trifluoroacetic anhydride, etc.; carbodiimide compounds such as dicyclohexylcarbodiimide, etc. One of these may be used singly or two or more thereof may be used in combination.

The polyamide acid composition may contain additives such as antioxidant, a light stabilizer, a surfactant, a flame retardant, a plasticizer, etc., within a range not detracting from the effects of the present invention. Silica microparticles to be mentioned below may also be incorporated in the polyamide acid composition.

By subjecting the polyamide acid composition to heating and dehydrating for ring closure, the polyimide resin of the present invention can be obtained.

The heating temperature can be selected from a range of generally from 100 to 400° C., preferably from 200 to 350° C., more preferably from 250 to 340° C. The heating time is generally from 1 minute to 6 hours, preferably from 5 minutes to 2 hours, more preferably from 15 minutes to 1 hour.

The heating atmosphere may be air gas, nitrogen gas, oxygen gas, hydrogen gas, nitrogen/hydrogen mixed gas, etc. For the purpose of preventing the resultant polyimide resin from being discolored, preferred is a nitrogen gas having an oxygen concentration of 100 ppm or less, or a nitrogen/hydrogen mixed gas having a hydrogen concentration of 0.5% or less.

Regarding the method for producing a polyimide film using the polyamide acid composition, for example, the polyamide acid composition is coated onto a glass substrate or the like, then heated, dried and dehydrated for ring closure thereon based on the above-mentioned condition, and thereafter the resultant film is peeled away from the substrate, thus obtaining a polyimide film. The coating method with the polyamide acid composition is not specifically limited, for which employable is any known method.

In the first aspect of the present invention, the thickness of the polyimide film produced using the polyamide acid composition is generally from 0.1 to 500 μm, preferably from 1 to 250 μm, more preferably from 5 to 100 μm, even more preferably from 10 to 50 μm.

[Polyimide Film]

The polyimide film of the first aspect of the present invention contains the polyimide resin of the first aspect of the present invention, and is excellent in transparency and has a low coefficient of linear thermal expansion. Preferably, the polyimide film of the first aspect of the present invention is formed of the polyimide resin of the first aspect of the present invention.

The polyimide film of the second aspect of the present invention contains the polyimide resin in the second aspect of the present invention, and has a low coefficient of linear thermal expansion. Preferably, the polyimide film of the second aspect of the present invention is formed of the polyimide resin in the second aspect of the present invention.

The method for forming the polyimide film of the present invention is not specifically limited, for which employable is any known method. For example, there is mentioned a method which includes forming the polyimide resin solution of the present invention containing an organic solvent or the resin composition of the present invention containing the polyimide resin and the above-mentioned various additives into a film by coating or shaping, and thereafter removing the organic solvent. Alternatively, the polyimide film may be formed using the polyamide acid composition mentioned above.

The thickness of the polyimide film of the first aspect of the present invention may be suitably selected in accordance with the intended use thereof. In general, the thickness falls within a range of from 0.1 to 500 μm, but preferably from 1 to 250 μm, more preferably from 5 to 100 μm, even more preferably from 10 to 50 μm.

The thickness of the polyimide film of the second aspect of the present invention may be from 10 to 50 μm and may be suitably selected in accordance with the intended use thereof. When the thickness is less than 10 μm, the film could hardly be used as a self-standing film, but when the thickness is more than 50 μm, decomposition may go on during imidation so that the film strength may lower. The thickness of the polyimide film of the second aspect of the present invention is preferably within a range of 10 to 50 μm, more preferably from 10 to 40 μm.

The total light transmittance of the polyimide film of the present invention is preferably 80% or more, when the thickness thereof is 30 μm. The total light transmittance is more preferably 82% or more, even more preferably 83% or more.

The coefficient of linear thermal expansion of the polyimide film of the present invention is preferably 15 ppm/°C. or less, more preferably 14 ppm/°C. or less. The glass transition temperature of the polyimide film is preferably 300°C. or higher, more preferably 320°C. or higher, even more preferably 350°C. or higher.

The total light transmittance and the coefficient of linear thermal expansion of the polyimide film can be measured specifically according to the methods described in the section of Examples.

[Laminate]

The first aspect of the present invention also provides a laminate having a substrate selected from plastic film, silicon wafer, metal foil and glass, and a polyimide resin layer containing the polyimide resin of the first aspect of the present invention. The laminate of the first aspect of the present invention may have at least one polyimide resin layer, and may have two or more polyimide resin layers.

The substrate to constitute the laminate of the first aspect of the present invention is selected from plastic film, silicon wafer, metal foil and glass.

Examples of the resin to constitute the plastic film include polyolefins such as homopolymers or copolymers of ethylene, propylene, isobutane, etc.; amorphous polyolefins such as cyclic polyolefins, etc.; polyesters such as polyethylene terephthalate, polyethylene-2,6-naphthalate, etc.; polyamides such as nylon 6, nylon 66, nylon 12, copolymer nylon, etc.; polyvinyl alcohol, ethylene-vinyl acetate copolymer partial hydrolyzate (EVOH), polyimide, polyether imide, polysulfone, polyether sulfone, polyether ether ketone, polycarbonate, polyarylate, fluororesin, acrylic resin; biodegradable resins such as polylactic acid, etc. Of those, preferred are polyethylene-2,6-naphthalate, polyimide, polyether imide, polysulfone, polyether sulfone and polycarbonate, from the viewpoint of the heat resistance and the dimensional stability of the laminate.

As the metal which constitutes the metal foil, any metal may be used as long as it has electroconductivity. Examples thereof include gold, silver, copper, iron and nickel. Of those, preferred is silver or copper, and more preferred is copper.

Of the above-mentioned substrate, the substrate is preferably a metal foil, more preferably a copper foil.

The thickness of the substrate may be suitably selected in accordance with the intended use of the laminate, and is preferably from 0.1 to 500 μm, more preferably from 1 to 250 μm.

The polyimide resin layer to constitute the laminate of the first aspect of the present invention contains at least the polyimide resin of the first aspect of the present invention. The thickness of the polyimide resin layer may be suitably selected in accordance with the intended use of the laminate, and is preferably from 0.5 to 50 μm, more preferably from 1 to 30 μm. In a case where the laminate of the first aspect of the present invention has two or more polyimide resin layers, the thickness of the polyimide resin layer means the total thickness of all the resin layers.

The production method for the laminate of the first aspect of the present invention is not specifically limited, for which employable is any known method. For example, there may be mentioned a method which includes applying the polyimide resin solution of the first aspect of the present invention containing an organic solvent, or the polyamide acid composition onto a substrate, followed by removing the organic solvent.

The polyimide film that contains the polyimide resin of the present invention is favorably used as films for various members such as color filters, flexible displays, semiconductor components, optical members, etc. The polyimide film of the second aspect of the present invention has a low CTE, and is therefore especially favorably used for glass substrate-alternative flexible films. The laminate of the first aspect of the present invention is favorably used as a substrate for printed-wiring assemblies.

EXAMPLES

The present invention is described more specifically with reference to Examples given below. However, the present invention is not whatsoever limited by these Examples.

Measurement methods for the physical properties of the polyimide films obtained in the following Examples are shown below.

(1) Coefficient of Linear Thermal Expansion (CTE)

Using a thermal mechanical analyzer (TMA/SS 6100) manufactured by SII Nano Technology Inc., TMA measurement was carried out under the condition of a heating rate of 10°C./min to measure CTE in the range of from 100 to 150°C.

CTE is preferably 15 ppm/°C. or less.

(2) Total Light Transmittance and Yellow Index (YI)

Using a color/turbidity coincidence measuring instrument (COH 400) manufactured by Nippon Denshoku Industries Co., Ltd., the samples having a different thickness as in Table 1 were measured. The total light transmittance is preferably 82% or more.

Of the following Examples, Examples 2 to 7 are examples belonging to the first aspect of the present invention, and Examples 1 to 7 are examples belonging to the second aspect of the present invention.

Example 1

<Preparation of DATA-CBDA Varnish>

In a 0.3-L five-neck round-bottomed glass flask equipped with a stainless, half-moon-shaped impeller, a nitrogen-introducing duct, a thermometer, and a glass end cap, 17.32 g (0.050 mol) of N,N'-bis(4-aminophenyl)terephthalamide (DATA, manufactured by Wakayama Seika Corporation), and 108.5 g of dimethylacetamide (DMAc, manufactured by Mitsubishi Gas Chemical Co., Inc.) were put, and stirred for a sufficient period of time in a nitrogen atmosphere at room temperature and at 200 rpm. 9.81 g (0.050 mol) of cyclobutanetetracarboxylic acid dianhydride (CBDA, manufactured by Wako Pure Chemical Industries, Ltd.) was put into the solution, and stirred for 15 minutes while the inner temperature was controlled so as not to be higher than 40°C. 135.6 g of DMAc was added and further stirred for 1 hour to give a polyamide acid solution having a solid concentration of 10% by mass.

<Production of DATA-CBDA Film>

The resultant polyamide acid solution was applied onto a glass plate with a bar coater, and heated at 80° C. for 2 hours to form a self-standing film. Without being peeled from the glass plate, the film was thermally imidated at 320° C. for 1 hour. After the thermal imidation, this was peeled from the glass plate, and annealed at 340° C. for 1 hour to be a polyimide film having a thickness of 22 µm.

Example 2

<Preparation of DATA-PMDAHH70-CBDA30 Varnish>

In a 0.3-L five-neck round-bottomed glass flask equipped with a stainless, half-moon-shaped impeller, a nitrogen-introducing duct, a thermometer, and a glass end cap, 17.32 g (0.050 mol) of N,N'-bis(4-aminophenyl)terephthalamide (DATA, manufactured by Wakayama Seika Corporation), and 114.4 g of dimethylacetamide (DMAc, manufactured by Mitsubishi Gas Chemical Co., Inc.) were put, and stirred for a sufficient period of time in a nitrogen atmosphere at room temperature and at 200 rpm. 7.85 g (0.035 mol) of cyclohexanetetracarboxylic acid dianhydride (PMDAHH, manufactured by Wako Pure Chemical Industries, Ltd.) and 2.94 g (0.015 mol) of cyclobutanetetracarboxylic acid dianhydride (CBDA, manufactured by Wako Pure Chemical Industries, Ltd.) were put into the solution, and stirred for 25 minutes while the inner temperature was controlled so as not to be higher than 40° C. 142.6 g of DMAc was added and further stirred for 30 minutes to give a polyamide acid solution having a solid concentration of 10% by mass.

<Production of DATA-PMDAHH70-CBDA30 Film>

The resultant polyamide acid solution was applied onto a glass plate with a bar coater, and heated at 80° C. for 2 hours to form a self-standing film. Without being peeled from the glass plate, the film was thermally imidated at 320° C. for 1 hour. After the thermal imidation, this was peeled from the glass plate, and annealed at 340° C. for 1 hour to be a polyimide film having a thickness of 11 µm.

Example 3

<Preparation of DATA-PMDAHH50-CBDA50 Varnish>

In a 0.3-L five-neck round-bottomed glass flask equipped with a stainless, half-moon-shaped impeller, a nitrogen-introducing duct, a thermometer, and a glass end cap, 17.32 g (0.050 mol) of N,N'-bis(4-aminophenyl)terephthalamide (DATA, manufactured by Wakayama Seika Corporation), and 111.3 g of dimethylacetamide (DMAc, manufactured by Mitsubishi Gas Chemical Co., Inc.) were put, and stirred for a sufficient period of time in a nitrogen atmosphere at room temperature and at 200 rpm. 5.61 g (0.025 mol) of cyclohexanetetracarboxylic acid dianhydride (PMDAHH, manufactured by Wako Pure Chemical Industries, Ltd.) and 4.90 g (0.025 mol) of cyclobutanetetracarboxylic acid dianhydride (CBDA, manufactured by Wako Pure Chemical Industries, Ltd.) were put into the solution, and stirred for 15 minutes while the inner temperature was controlled so as not to be higher than 40° C. 139.1 g of DMAc was added and further stirred for 40 minutes to give a polyamide acid solution having a solid concentration of 10% by mass.

<Production of DATA-PMDAHH50-CBDA50 Film>

The resultant polyamide acid solution was applied onto a glass plate with a bar coater, and heated at 80° C. for 2 hours to form a self-standing film. Without being peeled from the glass plate, the film was thermally imidated at 320° C. for 1 hour. After the thermal imidation, this was peeled from the glass plate, and annealed at 340° C. for 1 hour to be a polyimide film having a thickness of 12 µm.

Example 4

<Preparation of DATA-PMDAHH30-CBDA70 Varnish>

In a 0.3-L five-neck round-bottomed glass flask equipped with a stainless, half-moon-shaped impeller, a nitrogen-introducing duct, a thermometer, and a glass end cap, 17.32 g (0.050 mol) of N,N'-bis(4-aminophenyl)terephthalamide (DATA, manufactured by Wakayama Seika Corporation), and 111.3 g of dimethylacetamide (DMAc, manufactured by Mitsubishi Gas Chemical Co., Inc.) were put, and stirred for a sufficient period of time in a nitrogen atmosphere at room temperature and at 200 rpm. 3.37 g (0.015 mol) of cyclohexanetetracarboxylic acid dianhydride (PMDAHH, manufactured by Wako Pure Chemical Industries, Ltd.) and 6.86 g (0.035 mol) of cyclobutanetetracarboxylic acid dianhydride (CBDA, manufactured by Wako Pure Chemical Industries, Ltd.) were put into the solution, and stirred for 12 minutes while the inner temperature was controlled so as not to be higher than 40° C. 137.7 g of DMAc was added and further stirred for 40 minutes to give a polyamide acid solution having a solid concentration of 10% by mass.

<Production of DATA-PMDAHH30-CBDA70 Film>

The resultant polyamide acid solution was applied onto a glass plate with a bar coater, and heated at 80° C. for 2 hours to form a self-standing film. Without being peeled from the glass plate, the film was thermally imidated at 320° C. for 1 hour. After the thermal imidation, this was peeled from the glass plate, and annealed at 340° C. for 1 hour to be a polyimide film having a thickness of 15 µm.

Example 5

<Preparation of DATA70-TFMB30-CBDA Varnish>

In a 0.3-L five-neck round-bottomed glass flask equipped with a stainless, half-moon-shaped impeller, a nitrogen-introducing duct, a thermometer, and a glass end cap, 12.157 g (0.035 mol) of N,N'-bis(4-aminophenyl)terephthalamide (DATA, manufactured by Wakayama Seika Corporation), 4.817 g (0.015 mol) of 2,2'-bis(trifluoromethyl)-4,4'-diaminobiphenyl (TFMB, manufactured by Wakayama Seika Corporation), and 107.23 g of N,N-dimethylisobutylamide (DMIB, manufactured by Mitsubishi Gas Chemical Co., Inc.) were put, and stirred for a sufficient period of time in a nitrogen atmosphere at room temperature and at 200 rpm. 9.833 g (0.050 mol) of cyclobutanetetracarboxylic acid dianhydride (CBDA, manufactured by Wako Pure Chemical Industries, Ltd.) was put into the solution, and stirred for 25 minutes while the inner temperature was controlled so as not to be higher than 40° C. 117.77 g of DMIB was added and further stirred for 30 minutes to give a polyamide acid solution having a solid concentration of 10% by mass.

<Production of DATA70-TFMB30-CBDA Film>

The resultant polyamide acid solution was applied onto a glass plate with a bar coater, and heated at 80° C. for 2 hours to form a self-standing film. Without being peeled from the glass plate, the film was thermally imidated at 320° C. for 1 hour. After the thermal imidation, this was peeled from the glass plate, and annealed at 340° C. for 1 hour to be a polyimide film having a thickness of 10 µm.

Example 6

<Preparation of DATA50-TFMB50-CBDA Varnish>

In a 0.3-L five-neck round-bottomed glass flask equipped with a stainless, half-moon-shaped impeller, a nitrogen-introducing duct, a thermometer, and a glass end cap, 8.776 g (0.025 mol) of N,N'-bis(4-aminophenyl)terephthalamide (DATA, manufactured by Wakayama Seika Corporation), 8.113 g (0.025 mol) of 2,2'-bis(trifluoromethyl)-4,4'-diaminobiphenyl (TFMB, manufactured by Wakayama Seika Corporation), and 107.31 g of N,N-dimethylisobutylamide (DMIB, manufactured by Mitsubishi Gas Chemical Co., Inc.) were put, and stirred for a sufficient period of time in a nitrogen atmosphere at room temperature and at 200 rpm. 9.937 g (0.050 mol) of cyclobutanetetracarboxylic acid dianhydride (CBDA, manufactured by Wako Pure Chemical Industries, Ltd.) was put into the solution, and stirred for 25 minutes while the inner temperature was controlled so as not to be higher than 40° C. 142.6 g of DMIB was added and further stirred for 30 minutes to give a polyamide acid solution having a solid concentration of 10% by mass.

<Production of DATA50-TFMB50-CBDA Film>

The resultant polyamide acid solution was applied onto a glass plate with a bar coater, and heated at 80° C. for 2 hours to form a self-standing film. Without being peeled from the glass plate, the film was thermally imidated at 320° C. for 1 hour. After the thermal imidation, this was peeled from the glass plate, and annealed at 340° C. for 1 hour to be a polyimide film having a thickness of 13 μm.

Example 7

<Preparation of DATA30-TFMB70-CBDA Varnish>

In a 0.3-L five-neck round-bottomed glass flask equipped with a stainless, half-moon-shaped impeller, a nitrogen-introducing duct, a thermometer, and a glass end cap, 5.322 g (0.015 mol) of N,N'-bis(4-aminophenyl)terephthalamide (DATA, manufactured by Wakayama Seika Corporation), 11.480 g (0.035 mol) of 2,2'-bis(trifluoromethyl)-4,4'-diaminobiphenyl (TFMB, manufactured by Wakayama Seika Corporation), and 107.38 g of N,N-dimethylisobutylamide (DMIB, manufactured by Mitsubishi Gas Chemical Co., Inc.) were put, and stirred for a sufficient period of time in a nitrogen atmosphere at room temperature and at 200 rpm. 10.044 g (0.050 mol) of cyclobutanetetracarboxylic acid dianhydride (CBDA, manufactured by Wako Pure Chemical Industries, Ltd.) was put into the solution, and stirred for 25 minutes while the inner temperature was controlled so as not to be higher than 40° C. 117.62 g of DMIB was added and further stirred for 30 minutes to give a polyamide acid solution having a solid concentration of 10% by mass.

<Production of DATA30-TFMB70-CBDA Film>

The resultant polyamide acid solution was applied onto a glass plate with a bar coater, and heated at 80° C. for 2 hours to form a self-standing film. Without being peeled from the glass plate, the film was thermally imidated at 320° C. for 1 hour. After the thermal imidation, this was peeled from the glass plate, and annealed at 340° C. for 1 hour to be a polyimide film having a thickness of 15 μm.

Comparative Example 1

<Preparation of DATA-PMDAHH Varnish>

In a 0.3-L five-neck round-bottomed glass flask equipped with a stainless, half-moon-shaped impeller, a nitrogen-introducing duct, a thermometer, and a glass end cap, 17.32 g (0.050 mol) of N,N'-bis(4-aminophenyl)terephthalamide (DATA, manufactured by Wakayama Seika Corporation), and 114.1 g of dimethylacetamide (DMAc, manufactured by Mitsubishi Gas Chemical Co., Inc.) were put, and stirred for a sufficient period of time in a nitrogen atmosphere at room temperature and at 200 rpm. 11.22 g (0.050 mol) of cyclohexanetetracarboxylic acid dianhydride (PMDAHH, manufactured by Wako Pure Chemical Industries, Ltd.) was put into the solution, and stirred for 45 minutes while the inner temperature was controlled so as not to be higher than 40° C. 142.6 g of DMAc was added and further stirred for 30 minutes to give a polyamide acid solution having a solid concentration of 10% by mass.

<Production of DATA-PMDAHH Film>

The resultant polyamide acid solution was applied onto a glass plate with a bar coater, and heated at 80° C. for 2 hours to form a self-standing film. Without being peeled from the glass plate, the film was thermally imidated at 320° C. for 1 hour. After the thermal imidation, this was peeled from the glass plate, and annealed at 340° C. for 1 hour to be a polyimide film having a thickness of 11 μm.

Comparative Example 2

A polyimide film was produced in the same manner as in Example 1 except that the thickness was 7 μm.

TABLE 1

| | Example 1 | Example 2 | Example 3 | Example 4 | Example 5 | Example 6 | Example 7 | Comparative Example 1 | Comparative Example 2 |
|---|---|---|---|---|---|---|---|---|---|
| Acid Dianhydride | CBDA (100 mol %) | PMDAHH (70 mol %) CBDA (30 mol %) | PMDAHH (50 mol %) CBDA (50 mol %) | PMDAHH (30 mol %) CBDA (70 mol %) | CBDA | CBDA | CBDA | PMDAHH (100 mol %) | CBDA (100 mol %) |
| Diamine | DATA | DATA | DATA | DATA | DATA (70 mol %) TFMB (30 mol %) | DATA (50 mol %) TFMB (50 mol %) | DATA (30 mol %) TFMB (70 mol %) | DATA | DATA |
| Total Light Transmittance (%) | 82.6 | 84.1 | 84.7 | 83.1 | 82.3 | 83.9 | 85.9 | 85.9 | 83.4 |
| YI | 29.4 | 17.3 | 18.7 | 25.5 | 17.7 | 16.3 | 12.3 | 12.3 | 16.8 |
| CTE (ppm/° C.) | 11.6 | 13.8 | 12 | 10.6 | 8.1 | 10.9 | 12.6 | 16.6 | — |
| Film Thickness (μm) | 22 | 11 | 12 | 15 | 10 | 13 | 15 | 11 | 7 |

It can be said that the polyimide films of Examples 2 to 7 belonging to the first aspect of the present invention all have good and well-balanced CTE and total light transmittance, and exhibit excellent heat resistance. The polyimide films of Examples 1 to 7 belonging to the second aspect of the present invention are all good and have low CTE. In addition, the total light transmittance of these films is on a level with no problem, and the films can be said to exhibit excellent heat resistance. In particular, the polyimide films of Examples 2 and 3 both have a higher total light transmittance and are well balanced in point of CTE and the total light transmittance. As opposed to these, the polyimide film of Comparative Example 1 has high CTE as compared with the films of Examples. The polyimide film of Comparative Example 2 has a low light transmittance, and since the thickness thereof is small, the film strength is low and CTE thereof could not be measured.

The invention claimed is:

1. A polyimide resin comprising a structural unit represented by the following formula (1-1) and comprising at least one selected from the group consisting of a structural unit represented by the following formula (2-1) and a structural unit represented by the following formula (3):

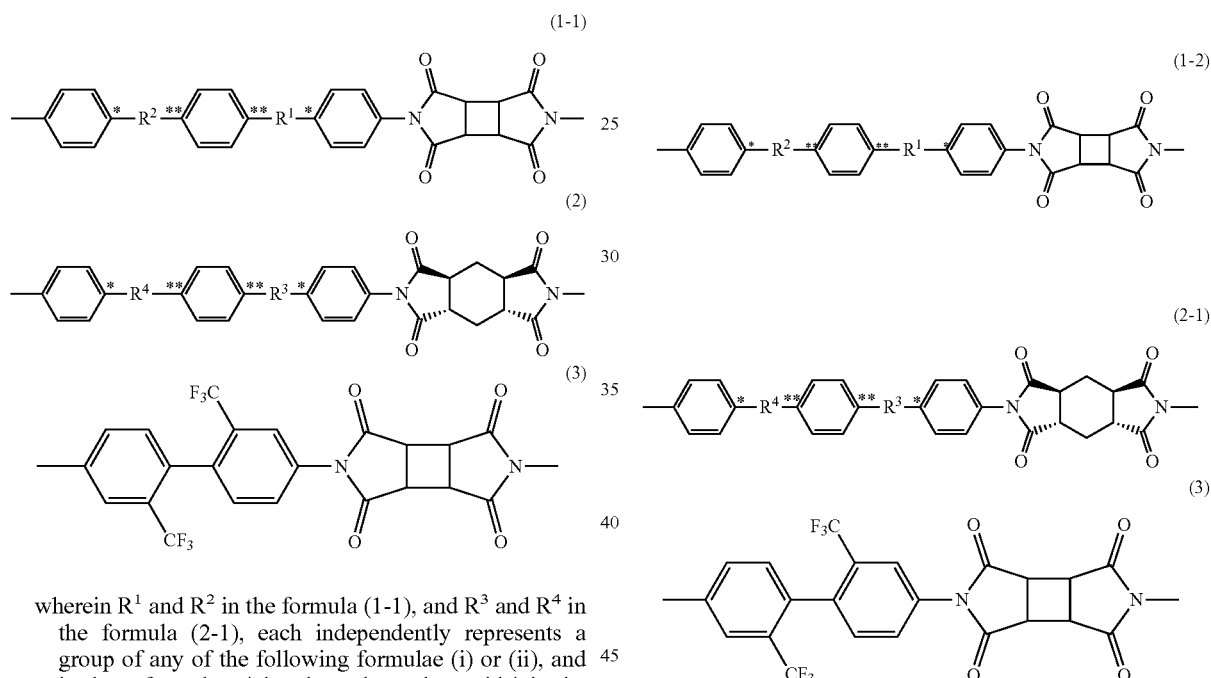

wherein $R^1$ and $R^2$ in the formula (1-1), and $R^3$ and $R^4$ in the formula (2-1), each independently represents a group of any of the following formulae (i) or (ii), and in these formulae, * bonds to the carbon with * in the formula (1-1) and the formula (2-1) and  bonds to the carbon with  in the formula (1-1) and the formula (2-1):

and wherein when a structural unit represented by formula (2-1) is present a molar ratio of the structural unit represented by the formula (1-1) to the structural unit represented by the formula (2-1) is 40/60 to 75/25.

2. The polyimide resin according to claim 1, which comprises the structural unit represented by the formula (1-1) and the structural unit represented by the formula (2-1), and in which $R^1$ and $R^2$ in the structural unit represented by the formula (1-1) each is the formula (i) and $R^3$ and $R^4$ in the structural unit represented by the formula (2-1) each is the formula (i).

3. The polyimide resin according to claim 1, which comprises the structural unit represented by the formula (1-1) and the structural unit represented by the formula (3), and in which the molar ratio of the structural unit represented by the formula (1-1) to the structural unit represented by the formula (3) is 20/80 to 80/20.

4. A polyimide film comprising the polyimide resin of claim 1.

5. A laminate comprising a substrate selected from a plastic film, a silicon wafer, a metal foil and glass, and a polyimide resin layer containing the polyimide resin of claim 1.

6. A polyimide film comprising a structural unit represented by the following formula (1-2), and at least one of formulae (2-1) and (3), and having a thickness of 10 to 50 µm:

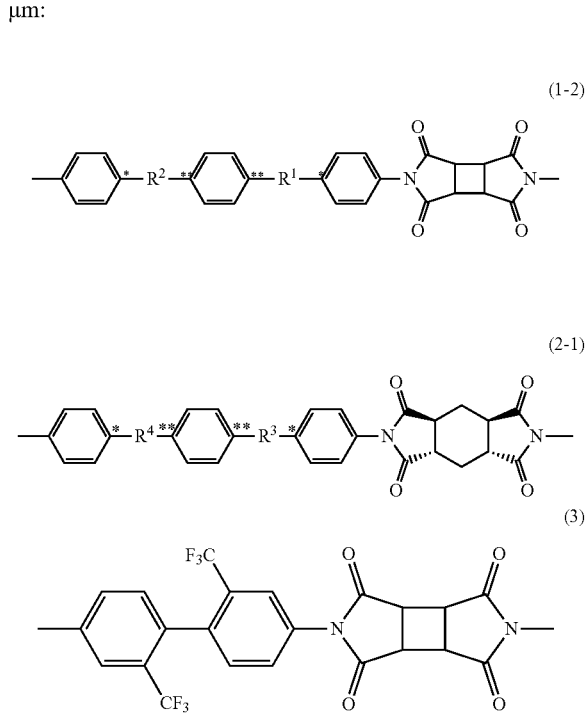

wherein $R^1$ through $R^4$ each independently represents a group of the following formula (i) or formula (ii), and in these formulae, * bonds to the carbon with * in the formulae (1-2) and (2-1) and  bonds to the carbon with  in the formulae (1-2) and (2-1):

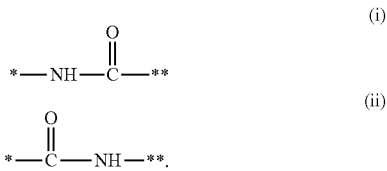

and wherein when a structural unit represented by formula (2-1) is present a molar ratio of the structural unit represented by the formula (1-2) to the structural unit represented by the formula (2-1) is 40/60 to 75/25.

7. The polyimide film according to claim 6, wherein $R^1$ and $R^2$ in the structural unit represented by the formula (1-2) each is the formula (i).

8. The polyimide film according to claim 6, comprising a structural unit represented by formula (2-1).

9. The polyimide film according to claim 8, wherein $R^3$ and $R^4$ in the structural unit represented by the formula (2-1) each is the formula (i).

10. The polyimide film according to claim 6, comprising a structural unit represented by formula (3).

11. The polyimide film according to claim 10, which comprises the structural unit represented by the formula (1-2) and the structural unit represented by the formula (3), and in which the molar ratio of the structural unit represented by the formula (1-2) to the structural unit represented by the formula (3) is 20/80 to 80/20.

\* \* \* \* \*